(12) United States Patent
Tochihara et al.

(10) Patent No.: US 9,562,144 B2
(45) Date of Patent: Feb. 7, 2017

(54) XYLYLENEDIAMINE COMPOSITION, AND METHOD FOR PRODUCING POLYAMIDE RESIN

(71) Applicant: Mitsubishi Gas Chemical Company, Inc., Tokyo (JP)

(72) Inventors: Tatsuya Tochihara, Niigata (JP); Katsumi Shinohara, Niigata (JP); Takashi Nakamura, Niigata (JP); Hajime Yamada, Niigata (JP); Jun Mitadera, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 14/648,006

(22) PCT Filed: Apr. 9, 2014

(86) PCT No.: PCT/JP2014/060346
§ 371 (c)(1),
(2) Date: May 28, 2015

(87) PCT Pub. No.: WO2014/178270
PCT Pub. Date: Nov. 6, 2014

(65) Prior Publication Data
US 2016/0039993 A1 Feb. 11, 2016

(30) Foreign Application Priority Data

Apr. 30, 2013 (JP) .................................. 2013-095705
Apr. 30, 2013 (JP) .................................. 2013-095708

(51) Int. Cl.
| C08K 5/17 | (2006.01) |
| C08G 69/30 | (2006.01) |
| C08G 59/50 | (2006.01) |
| C08G 69/28 | (2006.01) |
| C08G 69/26 | (2006.01) |
| C08L 77/06 | (2006.01) |

(52) U.S. Cl.
CPC ................. *C08K 5/17* (2013.01); *C08G 59/50* (2013.01); *C08G 59/5033* (2013.01); *C08G 69/265* (2013.01); *C08G 69/28* (2013.01); *C08G 69/30* (2013.01); *C08L 77/06* (2013.01)

(58) Field of Classification Search
CPC ........... C08K 5/17; C08G 69/28; C08G 69/30; C08G 59/5033
USPC ........................................................ 528/332
See application file for complete search history.

(56) References Cited

U.S. PATENT DOCUMENTS

| 2012/0128532 A1 | 5/2012 | Kashiba et al. |
| 2012/0172512 A1* | 7/2012 | Ishii ........................ C08L 25/18 524/405 |

FOREIGN PATENT DOCUMENTS

| JP | H11-158370 | 6/1999 |
| JP | 2003-26797 | 1/2003 |
| JP | 2008-050403 A | 3/2008 |
| JP | 2011-236285 A | 11/2011 |
| WO | 2011/030911 A1 | 3/2011 |

OTHER PUBLICATIONS

International Search Report date of mailing Jul. 15, 2014 for PCT/JP2014/060346 and English translation of the same (4 pages).

* cited by examiner

*Primary Examiner* — Bijan Ahvazi
*Assistant Examiner* — Ronald Grinsted
(74) *Attorney, Agent, or Firm* — Fitch, Even, Tabin & Flannery LLP

(57) ABSTRACT

Provided are a xylylenediamine composition containing xylylenediamine and bis(methylbenzyl)amine, a content of the bis(methylbenzyl)amine being 0.0005 to 0.1 parts by mass based on 100 parts by mass of the xylylenediamine; and a method for producing a polyamide resin including the steps of introducing a diamine containing xylylenediamine, a dicarboxylic acid, and bis(methylbenzyl)amine in an amount of 0.0005 to 0.1 parts by mass based on 100 parts by mass of the xylylenediamine into a reaction system and performing a polycondensation reaction.

13 Claims, No Drawings

XYLYLENEDIAMINE COMPOSITION, AND METHOD FOR PRODUCING POLYAMIDE RESIN

CROSS-REFERENCE TO RELATED APPLICATIONS

This application is a U.S. national phase application filed under 35 U.S.C. §371 of International Application PCT/JP2014/060346, filed on Apr. 09, 2014, designating the United States, which claims priority from Japanese Application Number 2013-095708, filed on Apr. 30, 2013, and Japanese Application Number 2013-095705, filed on Apr. 30, 2013, which are hereby incorporated herein by reference in their entirety.

TECHNICAL FIELD

The present invention relates to a xylylenediamine composition and a method for producing a polyamide resin.

BACKGROUND ART

Xylylenediamine is a compound useful as a raw material for polyamide resin, an epoxy resin curing agent, and a raw material for isocyanate compound or the like. However, it is known that xylylenediamine is apt to be changed in quality and colored due to light, heat, oxygen, or the like.

In addition, polyamide resins using xylylenediamine as a main diamine component are useful as a molding material containing a glass fiber or an inorganic filler because of their excellent mechanical performances, such as strength, elastic modulus, etc. In addition, the polyamide resins are also useful as a packaging material because of their excellent barrier properties against a gas, such as oxygen, carbon dioxide, etc. However, the polyamide resins involve such a problem that when exposed to a high-temperature atmosphere in a molten state or solid state, they are apt to be colored yellow, and their use was sometimes limited depending upon an application.

As a method for solving the above-described problem, for example, Japanese Patent Literature 2003-26797 discloses a polyamide resin resulting from polycondensation of a diamine containing xylylenediamine with a specified aliphatic dicarboxylic acid, in which a purity of the xylylenediamine used as the raw material diamine is 99.9% by weight or more and on heating the resin under a prescribed condition, a difference of a yellowness index (YI value) before and after heating is within 5.

Meanwhile, in order to improve processability or the like of a polyamide resin, it is known to add a crystal nucleating agent to the polyamide resin, thereby improving a crystallization rate (Japanese Patent Literature H11-158370). However, there is a concern that mechanical physical properties or the like of the polyamide resin are lowered depending upon the kind and use amount of the crystal nucleating agent used.

SUMMARY OF INVENTION

An object of the present invention is to provide a xylylenediamine composition which can be used as a raw material for polyamide resin, an epoxy resin curing agent, or a raw material for isocyanate compound or the like, and in particular, when used as a raw material for polyamide resin, is able to provide a polyamide resin that is less in coloration and fast in crystallization.

In addition, another problem of the present invention is to provide a method for producing a polyamide resin that is less in coloration and fast in crystallization, by using xylylenediamine as a diamine component.

The present inventors have astonishingly found that by incorporating a specified amount of a specified compound into xylylenediamine, when used as a raw material for polyamide resin, a polyamide resin that is less in coloration can be obtained; and further that a crystallization rate of the resulting polyamide resin can be improved.

In addition, the present inventors have found that by allowing a xylylenediamine-containing diamine and a dicarboxylic acid to react with each other under a specified condition, a polyamide resin that is less in coloration and fast in crystallization can be produced.

Specifically, the present invention provides [1] a xylylenediamine composition containing xylylenediamine and bis(methylbenzyl)amine, a content of the bis(methylbenzyl)amine being 0.0005 to 0.1 parts by mass based on 100 parts by mass of the xylylenediamine; and [2] a method for producing a polyamide resin including the steps of introducing a diamine containing xylylenediamine, a dicarboxylic acid, and bis(methylbenzyl)amine in an amount of 0.0005 to 0.1 parts by mass based on 100 parts by mass of the xylylenediamine into a reaction system and performing a polycondensation reaction.

When the xylylenediamine composition of the present invention is used as a raw material for polyamide resin, a polyamide resin that is less in coloration and fast in crystallization can be obtained. In addition, the xylylenediamine composition of the present invention is also suitable for various applications for an epoxy resin curing agent and the like, or as a raw material for isocyanate compound.

Furthermore, the polyamide resin resulting from the production method of the present invention is less in coloration, and therefore, it is suitably used for materials for packaging films, hollow containers, various molding materials, fibers, and the like. The polyamide resin resulting from the production method of the present invention is fast in crystallization and excellent in transparency and molding processability.

DESCRIPTION OF EMBODIMENTS

[Xylylenediamine Composition]

The xylylenediamine composition of the present invention (hereinafter also referred to simply as "composition of the present invention" or "composition") contains xylylenediamine and bis(methylbenzyl)amine, a content of the bis (methylbenzyl)amine being 0.0005 to 0.1 parts by mass based on 100 parts by mass of the xylylenediamine.

The xylylenediamine which is used in the present invention is preferably m-xylylenediamine, p-xylylenediamine, or a mixture thereof, and from the viewpoint of gas barrier properties of the resulting polyamide resin, the xylylenediamine is more preferably m-xylylenediamine. In addition, on processing into an injection molding material, from the viewpoints that the molding cycle is fast and that the strength and appearance of a molded article are improved, the xylylenediamine is more preferably a mixture of m-xylylenediamine and p-xylylenediamine.

The composition of the present invention contains xylylenediamine as a main component, and a content of the xylylenediamine in the composition is preferably 99.5% by mass or more, and more preferably 99.9% by mass or more.

It should be noted that the content of the xylylenediamine in the composition may be measured by, for example, gas chromatography (GC) analysis or the like.

As the xylylenediamine which is used in the present invention, industrially available xylylenediamine may be suitably used. Although such xylylenediamine sometimes contains a trace amount of impurities, there is no particular fault in the present invention.

The industrially available xylylenediamine may be produced by adopting a known method. For example, in the case where the xylylenediamine is m-xylylenediamine, examples of a production method thereof include a method of allowing m-xylene, ammonia, and an oxygen-containing gas to react with each other in the presence of a catalyst by a continuous reaction or a batch reaction, followed by hydrogenating formed isophthalonitrile; and the like.

The composition of the present invention further contains bis(methylbenzyl)amine. A content of the bis(methylbenzyl) amine is 0.0005 to 0.1 parts by mass, preferably 0.0005 to 0.08 parts by mass, more preferably 0.0005 to 0.04 parts by mass, still more preferably 0.0005 to 0.02 parts by mass, yet still more preferably 0.001 to 0.015 parts by mass, even yet still more preferably 0.001 to 0.01 parts by mass, and even still more preferably 0.001 to 0.005 parts by mass based on 100 parts by mass of the xylylenediamine.

So long as the content of the bis(methylbenzyl)amine in the composition falls within the foregoing range, when the composition is used as a raw material for polyamide resin, the resulting polyamide resin is less in coloration and fast in crystallization. Following an improvement in the crystallization rate of the polyamide resin, the molding processability is improved, so that a crystallization process time at the molding may be shortened, and the productivity of a molded article may be improved.

According to the present invention, in view of the fact that the above-described effects are obtained, a problem of lowering in mechanical physical properties or transparence, or the like, which is caused due to the addition of a crystal nucleating agent for the purpose of improving the molding processability or the like of the polyamide resin, may be avoided. In addition, a polyamide resin from which a molded article that is less in coloration may be easily produced is obtained.

Although a reason why the above-described effects are obtained by using the composition of the present invention as a raw material for polyamide resin is not always elucidated yet, as for reduction of the coloration of the polyamide resin, it may be considered that the bis(methylbenzyl)amine has an effect for capturing a radical emitted from the polyamide resin resulting from a polycondensation reaction between a diamine and a dicarboxylic acid, and therefore, deterioration of the polyamide resin to be caused due to the radical is suppressed. In addition, as for the effect for improving the crystallization rate of the polyamide resin, it may be considered that the bis(methylbenzyl)amine promotes the crystal nucleus formation in the polyamide resin, or the bis(methylbenzyl)amine itself serves as a starting point of the crystal nucleus formation.

In addition, in the xylylenediamine, there may be the case where an amino group in the molecule deteriorates at the storage to generate a trace amount of ammonia; however, it has also been found that the generation amount of ammonia is decreased due to the presence of bis(methylbenzyl)amine. From this matter, in view of the fact that the xylylenediamine composition contains bis(methylbenzyl)amine, an effect that the storage stability of the xylylenediamine is improved may also be expected.

Although a reason why the generation amount of ammonia is decreased is not always elucidated yet, it may be assumed that an effect for preventing the generation of a radical or its chain is brought due to some interaction between xylylenediamine and bis(methylbenzyl)amine.

The xylylenediamine composition of the present invention may be obtained by using commercially available xylylenediamine and bis(methylbenzyl)amine and controlling an amount of the bis(methylbenzyl)amine relative to the xylylenediamine to a prescribed range. In addition, in producing xylylenediamine, so long as it is possible to control the catalyst used or the production condition to a specified constitution and to perform the reaction so as to form a prescribed amount of the bis(methylbenzyl)amine in parallel, there are exemplified a method of utilizing it; and the like. In this case, the content of bis(methylbenzyl)amine in the composition may be determined by gas chromatography analysis or the like. For example, there are exemplified a method in which the xylylenediamine composition containing bis(methylbenzyl)amine is subjected to GC measurement, and the amount of bis(methylbenzyl)amine relative to the xylylenediamine is determined from a ratio of a peak value assigned to the xylylenediamine and a peak value assigned to the bis(methylbenzyl)amine; and the like.

The xylylenediamine composition of the present invention may be suitably used for a raw material for polyamide resin, an epoxy resin curing agent, a raw material for isocyanate compound, or the like.

In particular, the case where the xylylenediamine composition of the present invention is used for a raw material for polyamide resin is preferred from the standpoint that a polyamide that is less in coloration and fast in crystallization may be produced.

In the case where the xylylenediamine composition of the present invention is used for a raw material for polyamide resin, for example, a polyamide resin may be produced by introducing a diamine component containing the xylylenediamine composition of the present invention and a dicarboxylic acid component into a reaction system and performing a polycondensation reaction by a known method.

In the case where the xylylenediamine composition of the present invention is used for an epoxy resin curing agent, the xylylenediamine composition of the present invention may be used as the curing agent as it is, or a reaction product obtained by allowing the xylylenediamine composition of the present invention and a carbonyl group-containing compound, such as a carboxylic acid or a derivative thereof, etc., to react with each other by a known method may be used as the epoxy resin curing agent. Examples of the carboxylic acid derivative include carboxylic acid anhydrides and acid chlorides.

It should be noted that in the production of the epoxy resin curing agent, other component may be used in combination, if desired.

In addition, the xylylenediamine composition of the present invention is also suitable as a raw material for isocyanate compound. The isocyanate compound is used as a raw material for urethane resin or urea resin.

[Production Method of Polyamide Resin]

The production method of a polyamide resin of the present invention includes the steps of introducing a diamine containing xylylenediamine, a dicarboxylic acid, and bis (methylbenzyl)amine in an amount of 0.0005 to 0.1 parts by mass based on 100 parts by mass of the xylylenediamine into a reaction system and performing a polycondensation reaction.

It should be noted that in the production method of a polyamide resin of the present invention, though it is preferred to use the xylylenediamine composition of the present invention as described above, the production method is not limited thereto.

<Diamine Containing Xylylenediamine>

The diamine which is used in the present invention is a diamine containing xylylenediamine (hereinafter also referred to simply as "diamine"). The xylylenediamine is preferably m-xylylenediamine, p-xylylenediamine, or a mixture thereof, and more preferably m-xylylenediamine from the viewpoint of gas barrier properties of the resulting polyamide resin. By using the xylylenediamine-containing diamine, the resulting polyamide resin is excellent in melt moldability, mechanical properties, and gas barrier properties.

A content of the xylylenediamine in the diamine is preferably 70 mol % or more, more preferably 80 to 100 mol %, and still more preferably 90 to 100 mol %. So long as the content of the xylylenediamine in the diamine falls within the foregoing range, the resulting polyamide resin is excellent in melt moldability, mechanical properties, and gas barrier properties.

Examples of other diamine compound than the xylylenediamine, which is contained in the diamine, may include aliphatic diamines, such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, 2,4,4-trimethylhexamethylenediamine, etc.; alicyclic diamines, such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl) methane, 2,2-bis(4-aminocyclohexyl)propane, bis(aminomethyDdecalin, bis(aminomethyl)tricyclodecane, etc.; diamines having an aromatic ring, such as bis(4-aminophenyl) ether, p-phenylenediamine, bis(aminomethyl)naphthalene, etc.; and the like; however, the amine compound is not limited thereto. These diamines may be used solely or in combination of two or more kinds thereof.

<Dicarboxylic Acid>

Although the dicarboxylic acid which is used in the present invention is not particularly limited, from the viewpoints of molding processability, gas barrier properties, and mechanical properties, it is preferably at least one selected from an aliphatic dicarboxylic acid having 4 to 20 carbon atoms, terephthalic acid, and isophthalic acid, more preferably an aliphatic dicarboxylic acid having 4 to 20 carbon atoms, and still more preferably an aliphatic dicarboxylic acid having 4 to 12 carbon atoms.

Examples of the aliphatic dicarboxylic acid having 4 to 20 carbon atoms may include succinic acid, glutaric acid, adipic acid, pimelic acid, suberic acid, azelaic acid, sebacic acid, 1,10-decanedicarboxylic acid, 1,11-undecanedicarboxylic acid, 1,12-dodecanedicarboxylic acid, 1,14-tetradecanedicarboxylic acid, 1,16-hexadecanedicarboxylic acid, 1,18-octadecanedicarboxylic acid, and the like. Of these, at least one selected from adipic acid and sebacic acid is preferably used from the viewpoints of crystallinity and high elasticity. These dicarboxylic acids may be used solely or in combination of two or more kinds thereof.

Examples of other dicarboxylic acid which may be used as the dicarboxylic acid include aliphatic dicarboxylic acid having 3 carbon atoms or less, such as oxalic acid, malonic acid, etc.; and other aromatic dicarboxylic acids than terephthalic acid and isophthalic acid, such as 2,6-naphthalenedicarboxylic acid, etc.

A content of the aliphatic dicarboxylic acid having 4 to 20 carbon atoms in the dicarboxylic acid is preferably 50 mol % or more, more preferably 70 to 100 mol %, and still more preferably 85 to 100 mol %. So long as the content of the aliphatic dicarboxylic acid having 4 to 20 carbon atoms in the dicarboxylic acid falls within the foregoing range, the resulting polyamide resin is excellent in molding processability, gas barrier properties, and mechanical properties.

The production method of a polyamide resin of the present invention includes the steps of introducing the diamine containing xylylenediamine, the dicarboxylic acid, and a prescribed amount of the bis(methylbenzyl)amine into a reaction system and performing a polycondensation reaction. According to this, the polyamide resin resulting from the production method of the present invention is less in coloration and fast in crystallization.

Although a reason why the above-described effects are obtained by introducing a prescribed amount of the bis(methylbenzyl)amine into a reaction system and performing a polycondensation reaction is not always elucidated yet, as for reduction of the coloration of the polyamide resin, it may be considered that the bis(methylbenzyl)amine has an effect for capturing a radical emitted from the polyamide resin resulting from the polycondensation reaction between the diamine and the dicarboxylic acid, and therefore, deterioration of the polyamide resin to be caused due to the radical is suppressed. In addition, as for the effect for improving the crystallization rate of the polyamide resin, it may be considered that the bis(methylbenzyl)amine promotes the crystal nucleus formation in the polyamide resin, or the bis(methylbenzyl)amine itself serves as a starting point of the crystal nucleus formation.

From the viewpoints of the above-described effects, an introduction amount of the bis(methylbenzyl)amine into the reaction system is 0.0005 to 0.1 parts by mass, preferably 0.0005 to 0.08 parts by mass, more preferably 0.0005 to 0.04 parts by mass, still more preferably 0.0005 to 0.02 parts by mass, yet still more preferably 0.001 to 0.015 parts by mass, even yet still more preferably 0.001 to 0.01 parts by mass, and even still more preferably 0.001 to 0.005 parts by mass based on 100 parts by mass of the xylylenediamine in the above-described diamine. In the case where the introduction amount of the bis(methylbenzyl)amine into the reaction system is less than 0.0005 parts by mass or more than 0.1 parts by mass based on 100 parts by mass of the xylylenediamine in the above-described diamine, the YI value of the polyamide resin increases. In addition, the crystallization rate is lowered, and as a result, the molding processability of the polyamide resin becomes low.

The polycondensation reaction between a diamine and a dicarboxylic acid is not particularly limited, and any method, such as a pressurization method, an atmospheric dropping method, etc., is applicable. As an example thereof, there is exemplified a method of performing melt polycondensation (melt polymerization).

Specifically, there is exemplified a method in which a salt composed of a diamine and a dicarboxylic acid is heated in the presence of water in an atmospheric pressure or pressurized state and subjected to polycondensation in a molten state while removing the added water and water formed by the polycondensation. In addition, there is also exemplified a method in which a diamine is added directly to a dicarboxylic acid in a molten state, followed by performing polycondensation at atmospheric pressure or under an elevated pressure. In this case, in order to keep the reaction system in a uniform liquid state, the diamine and the dicarboxylic acid are continuously added, and meanwhile, the polycondensation is advanced while subjecting the reaction system to temperature rise in such a manner that a reaction temperature is not lower than melting points of the formed oligoamide and polyamide, Among the foregoing, it is preferred to adopt the melt polymerization method in which a diamine is added dropwise in a molten dicarboxylic acid at atmospheric pressure or under an elevated pressure, and the mixture is polymerized in a molten state while removing condensed water, because the molecular weight distribution of the polyamide resin may be made small.

A method of introducing the bis(methylbenzyl)amine into the reaction system is not particularly limited. For example, there are exemplified a method of introducing the bis (methylbenzyl)amine directly into the polycondensation reaction system; and a method of introducing a mixture of the raw material diamine or dicarboxylic acid and the bis(methylbenzyl)amine into the reaction system. For example, the above-described xylylenediamine composition of the present invention may be used as the mixture of the raw material diamine and the bis(methylbenzyl)amine.

In addition, in the production of xylylenediamine which is used in the present invention, so long as it is possible to control the catalyst used or the production condition to a specified constitution and to perform the reaction so as to form a prescribed amount of the bis(methylbenzyl)amine in parallel, there are exemplified a method of utilizing it; and the like. In this case, the content of the bis(methylbenzyl) amine in the xylylenediamine may be measured by gas chromatography (GC) analysis or the like. For example, there are exemplified a method in which the xylylenediamine containing bis(methylbenzyl)amine is subjected to GC measurement, and the content of bis(methylbenzyl) amine is determined from a ratio of a peak value assigned to the xylylenediamine and a peak value assigned to the bis(methylbenzyl)amine; and the like.

A molar ratio of the diamine and the dicarboxylic acid (diamine/dicarboxylic acid) is preferably in the range of 0.9 to 1.1, more preferably in the range of 0.93 to 1.07, still more preferably in the range of 0.95 to 1.05, and yet still more preferably in the range of 0.97 to 1.02. So long as the molar ratio falls within the foregoing range, an increase of the molecular weight is apt to be advanced.

In addition, for the purpose of promoting the amidation reaction, a phosphorus atom-containing compound may be added within the polycondensation reaction system. Examples of the phosphorus atom-containing compound include phosphinic acid compounds, such as dimethylphosphinic acid, phenylmethylphosphinic acid, etc.; hypophosphorous acid compounds, such as hypophosphorous acid, sodium hypophosphite, potassium hypophosphite, lithium hypophosphite, manganese hypophosphite, calcium hypophosphite, ethyl hypophosphite, etc.; phosphonic acid compounds, such as phosphonic acid, sodium phosphonate, potassium phosphonate, lithium phosphonate, potassium phosphonate, magnesium phosphonate, calcium phosphonate, phenylphosphonic acid, ethylphosphonic acid, sodium phenylphosphonate, potassium phenylphosphonate, lithium phenylphosphonate, diethyl phenylphosphonate, sodium ethylphosphonate, potassium ethylphosphonate, etc.; phosphonous acid compounds, such as phosphonous acid, sodium phosphonite, lithium phosphonite, potassium phosphonite, magnesium phosphonite, calcium phosphonite, phenylphosphonous acid, sodium phenylphosphonite, potassium phenylphosphonite, lithium phenylphosphonite, ethyl phenylphosphonite, etc.; phosphorous acid compounds, such as phosphorous acid, sodium hydrogenphosphite, sodium phosphite, lithium phosphite, potassium phosphite, magnesium phosphite, calcium phosphite, triethyl phosphite, triphenyl phosphite, pyrophosphorous acid, etc.; and the like.

Of these, in particular, hypophosphorous acid metal salts, such as sodium hypophosphite, potassium hypophosphite, lithium hypophosphite, etc., are preferably used because they promote the amidation reaction, with sodium hypophosphite being especially preferred. It should be noted that the phosphorus atom-containing compound which may be used in the present invention is not limited to these compounds.

An addition amount of the phosphorus atom-containing compound which is added within the polycondensation reaction system is preferably 0.1 to 1,000 ppm, more preferably 1 to 600 ppm, and still more preferably 5 to 400 ppm in terms of a phosphorus atom concentration in the polyamide resin.

In addition, from the viewpoint of controlling a polycondensation reaction rate, an alkali metal compound may be allowed to be further coexistent within the polymerization reaction system.

As the alkali metal compound, an alkali metal hydroxide or an alkali metal acetate is usually used. However, the above-described phosphorus atom-containing compounds containing an alkali metal are excluded. Examples thereof include lithium hydroxide, sodium hydroxide, potassium hydroxide, rubidium hydroxide, cesium hydroxide, lithium acetate, sodium acetate, potassium acetate, rubidium acetate, cesium acetate, and the like, and at least one selected from sodium hydroxide and sodium acetate is preferred. These alkali metal compounds may be used solely or in combination of two or more kinds thereof.

It should be noted that the alkali metal compound may be added within the polycondensation reaction system, or may be one originated from the dicarboxylic acid that is a raw material for polyamide resin.

A use amount of the alkali metal compound is preferably 1 to 500 ppm, more preferably 5 to 300 ppm, still more preferably 6 to 250 ppm, and yet still more preferably 10 to 200 ppm in terms of an alkali metal atom concentration in the polyamide resin. The use amount is a total amount of the alkali metal compound added within the polycondensation system and the alkali metal compound originated from the dicarboxylic acid that is a raw material for polyamide resin.

In addition, as for the use amount of the alkali metal compound, a value obtained by dividing a molar number of the alkali metal compound by a molar number of the above-described phosphorus atom-containing compound is usually a value in the range of 0.5 to 1.0, and the use amount is a value in the range of preferably 0.55 to 0.95, and more preferably 0.6 to 0.9. So long as the use amount falls within the foregoing range, the amidation reaction proceeds at an appropriate rate.

The phosphorus atom concentration and the sodium atom concentration in the polyamide resin may be measured by a known method, such as ICP emission spectral analysis, ICP mass analysis, X-ray photoelectron spectroscopic analysis, etc.

A temperature of the polycondensation reaction is preferably 150 to 300° C., more preferably 160 to 280° C., and still more preferably 170 to 270° C. So long as the polymerization temperature falls within the foregoing range, the polymerization reaction is rapidly advanced. In addition, thermal decomposition of the monomers, or the oligomers, polymers, or the like on the way of polymerization hardly takes place, and therefore, properties of the resulting polyamide resin become favorable.

A time of the polycondensation reaction is usually 1 to 5 hours after starting the dropwise addition of the diamine. So long as the polycondensation reaction time falls within the foregoing range, the molecular weight of the polyamide resin may be thoroughly increased, and coloration of the resulting polyamide resin may be more suppressed.

The thus obtained polyamide resin is taken out from a polymerization tank and pelletized, and the resulting pellets are then used upon drying or crystallization, if desired.

In addition, in order to increase a polymerization degree of the polyamide resin, the production method of the present invention may further include the step of performing solid-phase polymerization. The solid-phase polymerization may be performed by a known method, and for example, there is exemplified a method of performing heating in a nitrogen atmosphere at a temperature of 100° C. or higher and lower than a melting point of the polyamide for 1 to 24 hours.

As a heating device to be used for drying or solid-phase polymerization, a continuous heat drying device, a rotary drum-type heating device called a tumble dryer, a conical dryer, or a rotary dryer, and a cone-shaped heating device equipped with a rotary blade on its inside, called a nauta mixer, may be suitably used. However, the heating device is not limited thereto, and a known device may be used.

From the viewpoints of moldability and mechanical properties, a relative viscosity of the thus produced polyamide resin is preferably in the range of 1.0 to 5.0, and more preferably in the range of 1.5 to 4.0. Specifically, the relative viscosity of the polyamide resin may be measured by the method described in the working examples.

From the viewpoints of melt moldability and mechanical properties, a number average molecular weight (Mn) of the polyamide resin resulting from the production method of the present invention is in the range of preferably 10,000 to 50,000, and more preferably 12,000 to 40,000. It should be noted that specifically, the number average molecular weight of the polyamide resin may be measured by the method described in the working examples.

The polyamide resin resulting from the production method of the present invention is less in coloration as compared with the case where the introduction amount of the bis(methylbenzyl)amine into the reaction system falls outside the scope defined in the present application.

A YI value of the polyamide resin measured in conformity with JIS K7373 may be made to be in the range of preferably −20 to 5, and more preferably −20 to 2. It should be noted that specifically, the YI value of the polyamide resin may be measured by the method described in the working examples.

In addition, the polyamide resin resulting from the production method of the present invention is fast in crystallization as compared with the case where the introduction amount of the bis(methylbenzyl)amine into the reaction system falls outside the scope defined in the present application. For that reason, the molding processability of the polyamide resin is improved, so that a crystallization process time at the molding may be shortened, namely the molding cycle becomes fast, whereby the productivity of a molded article may be improved. In addition, problems to be caused due to be the addition of a crystal nucleating agent, such as lowering in transparency, lowering in mechanical physical properties, etc., may be avoided. In consequence, a haze value when the polyamide resin is formed in a film having a thickness of 100 μm may be made to be preferably 10% or less, and more preferably 5% or less. The haze value may be measured by using a turbidity meter (Model: COH-300A, manufactured by Nippon Denshoku Industries Co., Ltd.), and specifically, the haze value may be measured by the method described in the working examples.

The crystallization rate of the polyamide resin may be evaluated by measuring a crystallization half-time. The crystallization half-time as referred to herein indicates a time until the crystallization is advanced a half in the case where a certain crystalline material transfers from a fused state to a crystallized state, and it may be said that the shorter the crystallization half-time, the faster the crystallization rate of that material is.

In the production method of the present invention, the crystallization half-time of the resulting polyamide resin may be made to be preferably 100 seconds or less, more preferably 90 seconds or less, and more preferably 85 seconds or less. Specifically, the crystallization half-time may be measured by the method described in the working examples.

It should be noted that the polyamide resin may be compounded with additives, such as a delustering agent, a heat stabilizer, a weathering stabilizer, an ultraviolet absorber, a plasticizer, a flame retardant, an antistatic agent, an anti-coloring agent, an anti-gelling agent, etc., if desired so long as properties thereof are not impaired.

The polyamide resin resulting from the production method of the present invention may be molded into a variety of forms by a conventionally known molding method. Examples of the molding method may include molding methods, such as injection molding, blow molding, extrusion molding, compression molding, vacuum molding, press molding, direct blow molding, rotational molding, sandwich molding, two-color molding, etc.

In view of the fact that the polyamide resin resulting from the production method of the present invention is fast in crystallization rate, the crystallization process time at the molding may be shortened, namely the molding cycle becomes fast, whereby the productivity may be improved. A molded article containing the above-described polyamide resin is suitable for materials for packaging films, hollow containers, various molding materials, fibers, and the like. In addition, since the molded article is less in coloration and is not impaired in transparency, it is especially suitable for packaging films, hollow containers, and the like, for which high transparency is required.

EXAMPLES

The present invention is hereunder described in more detail by way of Examples, but it should not be construed that the present invention is limited thereto. It should be noted that measurement for a variety of items in the Examples was performed by the following methods.

<Relative Viscosity>

0.2 g of a polyamide resin obtained in each of the Examples and Comparative Examples was weighed accurately and dissolved in 20 mL of 96% sulfuric acid with stirring at 20 to 30° C. After the polyamide resin was dissolved completely, 5 mL of the solution was immediately taken into a Canon-Fenske viscometer and allowed to stand in a thermostat bath at 25° C. for 10 minutes, and then a falling time (t) was measured. In addition, a falling time ($t_0$) of the 96% sulfuric acid itself was measured in the same way. A relative viscosity was calculated from t and $t_0$ according to the following equation.

Relative viscosity=$t/t_0$

\<Number Average Molecular Weight (Mn)\>

A number average molecular weight of a polyamide resin obtained in each of the Examples and Comparative Examples was determined as follows. Namely, first of all, a sample was dissolved in a phenol/ethanol mixed solvent and a benzyl alcohol solvent, respectively, and a carboxyl terminal group concentration and an amino terminal group concentration were determined by means of neutral titration with hydrochloric acid and a sodium hydroxide aqueous solution, respectively. The number average molecular weight was determined from quantitative values of the amino terminal group concentration and the carboxyl terminal group concentration according to the following equation.

$$\text{Number average molecular weight} = 2 \times 1{,}000{,}000 / ([NH_2] + [COOH])$$

$[NH_2]$: Amino terminal group concentration (μeq/g)
$[COOH]$: Carboxyl terminal group concentration (μeq/g)

\<YI Value\>

A YI value was measured in conformity with JIS K7373. The YI value was measured by using polyamide resin pellets obtained in each of the Examples and Comparative Examples with a color difference measurement device (Model: Z-Σ80 Color Measuring System, manufactured by Nippon Denshoku Industries Co., Ltd.).

\<Haze Value\>

Polyamide resin pellets obtained in each of the Examples and Comparative Examples were dried, and the dried pellets were extruded under a condition at (melting point)+20° C. by a uniaxial extruder, thereby fabricating a film having a thickness of 100 μm. A haze value was measured by the transmission method using a turbidity meter (Model: COH-300A, manufactured by Nippon Denshoku Industries Co., Ltd.).

\<Crystallization Half-Time\>

Using polyamide resin pellets obtained in each of the Examples and Comparative Examples, a film having a thickness of 100 μm was fabricated in the same way as described above. The film was sandwiched between cover glasses and melted and held at (melting point)+30° C. of the polyamide resin, and immediately thereafter, the resultant was cooled by an oil bath at 160° C. A crystallization half-time was measured by the depolarization light intensity method with a crystallization rate analyzer (Model: MK701, manufactured by Kotaki Seisakusho Co., Ltd.).

In the following Examples, m-xylylenediamine (MXDA) and p-xylylenediamine (PXDA), both of which are manufactured by Tokyo Chemical Industry Co., Ltd., were used. In addition, as the bis(3-methylbenzyl)amine, bis(3-methylbenzyl)amine produced in the following Production Example 1 was used.

Production Example 1

Production of Bis(3-methylbenzyl)amine

A one-liter autoclave was charged with 511.5 g of 3-methylbenzonitrile and 75 g of a 0.5% Pd/Al$_2$O$_3$ catalyst (manufactured by Clariant Catalysts (Japan) K.K.), the reactor was purged with hydrogen, and the pressure was then increased to 0.6 MPa. The temperature was raised while stirring the reaction solution under circulation of hydrogen, and when the temperature reached 100° C., the reaction was commenced and continued for 110 hours. After completion of the reaction, the catalyst was filtered off by a membrane filter (0.2 μm, manufactured by Merck Millipore), and the filtrate was subjected to distillation purification, thereby obtaining a distillate under a pressure of 0.77 kPa at a temperature of 174 to 176° C. The resulting distillate was confirmed to be bis(3-methylbenzyl)amine (purity: 97%) by means of GC-MS and $^1$H-NMR.

Example 1

Preparation of Xylylenediamine Composition

A xylylenediamine composition was prepared in such a manner that a content of bis(3-methylbenzyl)amine was 0.001 parts by mass based on 100 parts by mass of m-xylylenediamine.

(Production of Polyamide Resin)

A reaction container equipped with a stirrer, a partial condenser, a total condenser, a thermometer, a dropping funnel, a nitrogen inlet tube, and a strand die was charged with 10 kg (68.43 moles) of adipic acid (manufactured by Rhodia), and after thoroughly purging with nitrogen, the resultant was further heat melted to 170° C. under a small amount of nitrogen stream while stirring the inside of the system. 9.273 kg of the thus obtained xylylenediamine composition (containing 68.08 moles of m-xylylenediamine) was added dropwise to the molten adipic acid under stirring, and the inner temperature was continuously raised to 240° C. over 2.5 hours while discharging formed condensed water to the outside of the system.

After completion of the dropwise addition of the xylylenediamine composition, the inner temperature was raised; at the point of time when the temperature reached 250° C., the inside of the reaction container was evacuated; the inner temperature was further raised; and a melt polycondensation reaction was continued at 255° C. for 20 minutes. Thereafter, the inside of the system was pressurized with nitrogen, and the resulting polymer was taken out from the strand die and pelletized, thereby obtaining a polyamide resin. The resulting polyamide resin was subjected to the above-described evaluations. The results are shown in Table 1.

(Solid-Phase Polymerization)

In addition, 500 g of the above-described polyamide resin was charged in a 2-liter eggplant type flask, and after thoroughly purging with nitrogen, the polyamide resin was heated in an oil bath at 190° C. for 4 hours while evacuating, thereby performing solid-phase polymerization. As for the polyamide resin after the solid-phase polymerization, the YI value was measured in the same way as described above. The results are shown in Table 1.

Examples 2 to 3 and Comparative Examples 1 to 2

Xylylenediamine compositions were prepared in the same manner as in Example 1, except that in Example 1, the content of the bis(3-methylbenzyl)amine in the xylylenediamine composition was respectively changed as shown in Table 1. In addition, using these xylylenediamine compositions, polyamide resins were produced and subjected to the above-described evaluations. The results are shown in Table 1.

TABLE 1

|  |  | Unit | Example 1 | Example 2 | Example 3 | Comparative Example 1 | Comparative Example 2 |
|---|---|---|---|---|---|---|---|
| Xylylenediamine composition | Kind of xylylenediamine | — | MXDA | MXDA | MXDA | MXDA | MXDA |
|  | Content of bis(3-methylbenzyl)amine *[1] | parts by mass | 0.001 | 0.02 | 0.0677 | 0 | 0.12 |
| Polyamide resin | Kind of dicarboxylic acid | — | Adipic acid | Adipic acid | Adipic acid | Adipic acid | Adipic acid |
|  | Not subjected to solid-phase polymerization — Relative viscosity | — | 2.1 | 2.1 | 2.1 | 2.1 | 2.1 |
|  | Number average molecular weight | — | 16000 | 16000 | 16000 | 16000 | 16000 |
|  | YI value | — | 0.20 | 0.00 | −0.12 | 0.30 | 0.50 |
|  | Haze value | % | 0.1 | 0.1 | 0.1 | 0.1 | 0.3 |
|  | Crystallization half-time | sec | 60 | 70 | 84 | 91 | 92 |
| Subjected to solid-phase polymerization | YI value | — | 0.80 | 0.20 | 0.55 | 1.73 | 4.10 |

*[1] Amount based on 100 parts by mass of xylylenediamine

Examples 4 to 9 and Comparative Example 3

Xylylenediamine compositions were prepared in the same manner as in Example 1, except that in Example 1, the content of the bis(3-methylbenzyl)amine in the xylylenediamine composition was respectively changed as shown in Table 2. In addition, polyamide resins were produced in the same manner as in Example 1, except that in the production of a polyamide resin, 0.438 g of sodium hypophosphite monohydrate/sodium acetate (molar ratio=1.5/1) was added simultaneously with charging of adipic acid, thereby performing a melt polycondensation reaction, followed by subjecting to the above-described evaluations. The results are shown in Table 2.

TABLE 2

|  |  | Unit | Example 4 | Example 5 | Example 6 | Example 7 | Example 8 | Example 9 | Comparative Example 3 |
|---|---|---|---|---|---|---|---|---|---|
| Xylylenediamine composition | Kind of xylylenediamine | — | MXDA | MXDA | MXDA | MXDA | MXDA | MXDA | MXDA |
|  | Content of bis(3-methylbenzyl)amine *[1] | parts by mass | 0.0005 | 0.001 | 0.002 | 0.005 | 0.01 | 0.02 | 0 |
| Polyamide resin | Kind of dicarboxylic acid | — | Adipic acid | Adipic acid | Adipic acid | Adipic acid | Adipic acid | Adipic acid | Adipic acid |
|  | Not subjected to solid-phase polymerization Relative viscosity | — | 2.1 | 2.1 | 2.1 | 2.1 | 2.1 | 2.1 | 2.1 |
|  | Number average molecular weight | — | 16000 | 16000 | 16000 | 16000 | 16000 | 16000 | 16000 |
|  | YI value | — | −0.50 | −0.60 | −1.10 | −0.70 | −0.50 | 0.50 | 0.00 |
|  | Haze value | % | 0.1 | 0.1 | 0.1 | 0.1 | 0.1 | 0.1 | 0.1 |
|  | Crystallization half-time | sec | 68 | 65 | 55 | 63 | 60 | 67 | 70 |
| Subjected to solid-phase polymerization | YI value | — | −3.50 | −5.10 | −7.70 | −5.00 | −4.50 | −3.20 | −3.00 |

*[1] Amount based on 100 parts by mass of xylylenediamine

Example 10

A xylylenediamine composition was prepared in such a manner that a content of bis(3-methylbenzyl)amine was 0.01 parts by mass based on 100 parts by mass of mixed xylylenediamine having a mass ratio of m-xylylenediamine to p-xylylenediamine of 70/30.

A reaction container equipped with a stirrer, a partial condenser, a total condenser, a thermometer, a dropping funnel, a nitrogen inlet tube, and a strand die was charged with 10 kg (68.43 moles) of adipic acid (manufactured by Rhodia) and 13.14 g of sodium hypophosphite monohydrate/sodium acetate (molar ratio=1.5/1), and after thoroughly purging with nitrogen, the resultant was further heat melted to 170° C. under a small amount of nitrogen stream while stirring the inside of the system. 9.274 kg of the thus obtained xylylenediamine composition (containing 47.66 moles of m-xylylenediamine and 20.42 moles of p-xylylenediamine) was added dropwise to the molten adipic acid under stirring, and the inner temperature was continuously raised to 260° C. over 2.5 hours while discharging formed condensed water to the outside of the system.

After completion of the dropwise addition of the xylylenediamine composition, the inner temperature was raised; at the point of time when the temperature reached 270° C., the inside of the reaction container was evacuated; the inner temperature was further raised; and a melt polycondensation reaction was continued at 275° C. for 20 minutes. Thereafter, the inside of the system was pressurized with nitrogen, and the resulting polymer was taken out from the strand die and pelletized, thereby obtaining a polyamide resin. The resulting polyamide resin was subjected to the above-described evaluations. The results are shown in Table 3.

In addition, the polyamide resin was subjected to solid-phase polymerization in the same manner as in Example 1, and as for the polyamide resin after the solid-phase polymerization, the YI value was measured in the same way as described above. The results are shown in Table 3.

Comparative Example 4

A polyamide resin was produced in the same manner as in Example 10, except for not using the bis(3-methylbenzyl)amine and subjected to the above-described evaluations. The results are shown in Table 3.

Example 12

A xylylenediamine composition was prepared in such a manner that a content of bis(3-methylbenzyl)amine was 0.005 parts by mass based on 100 parts by mass of mixed

TABLE 3

| | | Unit | Example 10 | Comparative Example 4 |
|---|---|---|---|---|
| Xylylenediamine composition | Kind of xylylenediamine (MXDA/PXDA mass ratio) | — | MXDA/PXDA (70/30) | MXDA/PXDA (70/30) |
| | Content of bis(3-methylbenzyl)amine *1 | parts by mass | 0.01 | 0 |
| Polyamide resin | Kind of dicarboxylic acid | — | Adipic acid | Adipic acid |
| | Not subjected to solid-phase polymerization — Relative viscosity | — | 2.1 | 2.1 |
| | Number average molecular weight | — | 16000 | 16000 |
| | YI value | — | −0.50 | 0.50 |
| | Haze value | % | 0.2 | 0.2 |
| | Crystallization half-time | sec | 5 | 6 |
| | Subjected to solid-phase polymerization — YI value | — | −12.00 | −9.00 |

*1 Amount based on 100 parts by mass of xylylenediamine

Example 11

A xylylenediamine composition was prepared in such a manner that a content of bis(3-methylbenzyl)amine was 0.005 parts by mass based on 100 parts by mass of mixed xylylenediamine having a mass ratio of m-xylylenediamine to p-xylylenediamine of 70/30.

A reaction container equipped with a stirrer, a partial condenser, a total condenser, a thermometer, a dropping funnel, a nitrogen inlet tube, and a strand die was charged with 10 kg (49.4 moles) of sebacic acid (TA Grade, manufactured by Itoh Oil Chemicals Co., Ltd.) and 11.66 g of sodium hypophosphite monohydrate/sodium acetate (molar ratio=1.5/1), and after thoroughly purging with nitrogen, the resultant was further heat melted to 170° C. under a small amount of nitrogen stream while stirring the inside of the system. 6.680 kg of the thus obtained xylylenediamine composition (containing 34.33 moles of m-xylylenediamine and 14.71 moles of p-xylylenediamine) was added dropwise to the molten sebacic acid under stirring, and the inner temperature was continuously raised to 240° C. over 2.5 hours while discharging formed condensed water to the outside of the system.

After completion of the dropwise addition of the xylylenediamine composition, the inner temperature was raised; at the point of time when the temperature reached 250° C., the inside of the reaction container was evacuated; the inner temperature was further raised; and a melt polycondensation reaction was continued at 255° C. for 20 minutes. Thereafter, the inside of the system was pressurized with nitrogen, and the resulting polymer was taken out from the strand die and pelletized, thereby obtaining a polyamide resin. The resulting polyamide resin was subjected to the above-described evaluations. The results are shown in Table 4.

In addition, the polyamide resin was subjected to solid-phase polymerization in the same manner as in Example 1, and as for the polyamide resin after the solid-phase polymerization, the YI value was measured in the same way as described above. The results are shown in Table 4.

xylylenediamine having a mass ratio of m-xylylenediamine to p-xylylenediamine of 30/70.

A reaction container equipped with a stirrer, a partial condenser, a total condenser, a thermometer, a dropping funnel, a nitrogen inlet tube, and a strand die was charged with 10 kg (49.4 moles) of sebacic acid (TA Grade, manufactured by Itoh Oil Chemicals Co., Ltd.) and 11.66 g of sodium hypophosphite monohydrate/sodium acetate (molar ratio=1.5/1), and after thoroughly purging with nitrogen, the resultant was further heat melted to 170° C. under a small amount of nitrogen stream while stirring the inside of the system. 6.680 kg of the thus obtained xylylenediamine composition (containing 14.71 moles of m-xylylenediamine and 34.33 moles of p-xylylenediamine) was added dropwise to the molten sebacic acid under stirring, and the inner temperature was continuously raised to 262° C. over 2.5 hours while discharging formed condensed water to the outside of the system.

After completion of the dropwise addition of the xylylenediamine composition, the inner temperature was raised; at the point of time when the temperature reached 265° C., the inside of the reaction container was evacuated; the inner temperature was further raised; and a melt polycondensation reaction was continued at 275° C. for 20 minutes. Thereafter, the inside of the system was pressurized with nitrogen, and the resulting polymer was taken out from the strand die and pelletized, thereby obtaining a polyamide resin. The resulting polyamide resin was subjected to the above-described evaluations. The results are shown in Table 4.

In addition, the polyamide resin was subjected to solid-phase polymerization in the same manner as in Example 1, and as for the polyamide resin after the solid-phase polymerization, the YI value was measured in the same way as described above. The results are shown in Table 4.

TABLE 4

| | | Unit | Example 11 | Example 12 |
|---|---|---|---|---|
| Xylylenediamine composition | Kind of xylylenediamine (MXDA/PXDA mass ratio) | — | MXDA/PXDA (70/30) | MXDA/PXDA (30/70) |
| | Content of bis(3-methylbenzyl)amine [*1] | parts by mass | 0.005 | 0.005 |
| Polyamide resin | Kind of dicarboxylic acid | — | Sebacic acid | Sebacic acid |
| Not subjected to solid-phase polymerization | Relative viscosity | — | 2.26 | 2.26 |
| | Number average molecular weight | — | 15000 | 15000 |
| | YI value | — | 1.30 | −1.00 |
| | Haze value | % | 0.1 | 0.1 |
| | Crystallization half-time | sec | 25 | 8 |
| Subjected to solid-phase polymerization | YI value | — | −13.60 | −14.00 |

[*1] Amount based on 100 parts by mass of xylylenediamine

It is noted from the results of Tables 1 to 4 that the polyamide resins obtained by the production method of the present invention by using the xylylenediamine composition of the present invention are less in coloration and fast in crystallization as compared with the polyamide resins of the Comparative Examples.

When the xylylenediamine composition of the present invention is used as a raw material for polyamide resin, a polyamide resin that is less in coloration and fast in crystallization can be obtained. In addition, the xylylenediamine composition of the present invention is also suitable for various applications for an epoxy resin curing agent and the like, or as a raw material for isocyanate compound.

In addition, the polyamide resin resulting from the production method of the present invention is less in coloration, and therefore, it is suitably used for materials for packaging films, hollow containers, various molding materials, fibers, and the like. The polyamide resin resulting from the production method of the present invention is fast in crystallization and excellent in transparency and molding processability.

The invention claimed is:

1. A xylylenediamine composition comprising xylylenediamine and bis(methylbenzyl)amine, a content of the bis(methylbenzyl)amine being 0.0005 to 0.1 parts by mass based on 100 parts by mass of the xylylenediamine.

2. The xylylenediamine composition according to claim 1, wherein the xylylenediamine is m-xylylenediamine, p-xylylenediamine, or a mixture thereof.

3. The xylylenediamine composition according to claim 1, wherein the xylylenediamine is m-xylylenediamine.

4. The xylylenediamine composition according to claim 1, wherein a content of the xylylenediamine is 99.5% by mass or more.

5. The xylylenediamine composition according to claim 1, which is used for a raw material for polyamide resin.

6. The xylylenediamine composition according to claim 1, which is used for an epoxy resin curing agent.

7. A method for producing a polyamide resin comprising the steps of introducing a diamine containing xylylenediamine, a dicarboxylic acid, and bis(methylbenzyl)amine in an amount of 0.0005 to 0.1 parts by mass based on 100 parts by mass of the xylylenediamine into a reaction system and performing a polycondensation reaction.

8. The method for producing a polyamide resin according to claim 7, wherein the dicarboxylic acid is at least one selected from the group consisting of an aliphatic dicarboxylic acid having 4 to 20 carbon atoms, terephthalic acid, and isophthalic acid.

9. The method for producing a polyamide resin according to claim 7, wherein a content of the xylylenediamine in the diamine is 70 mol % or more, and a content of the aliphatic dicarboxylic acid having 4 to 20 carbon atoms in the dicarboxylic acid is 50 mol % or more.

10. The method for producing a polyamide resin according to claim 8, wherein the aliphatic dicarboxylic acid having 4 to 20 carbon atoms is at least one selected from the group consisting of adipic acid and sebacic acid.

11. The method for producing a polyamide resin according to claim 7, wherein the xylylenediamine is m-xylylenediamine, p-xylylenediamine, or a mixture thereof.

12. The method for producing a polyamide resin according to claim 7, wherein the xylylenediamine is m-xylylenediamine.

13. The method for producing a polyamide resin according to claim 7, further comprising the step of performing solid-phase polymerization.

* * * * *